Oct. 20, 1964     H. G. BOLMES ETAL     3,153,545
TRAILER COUPLING
Filed May 7, 1963
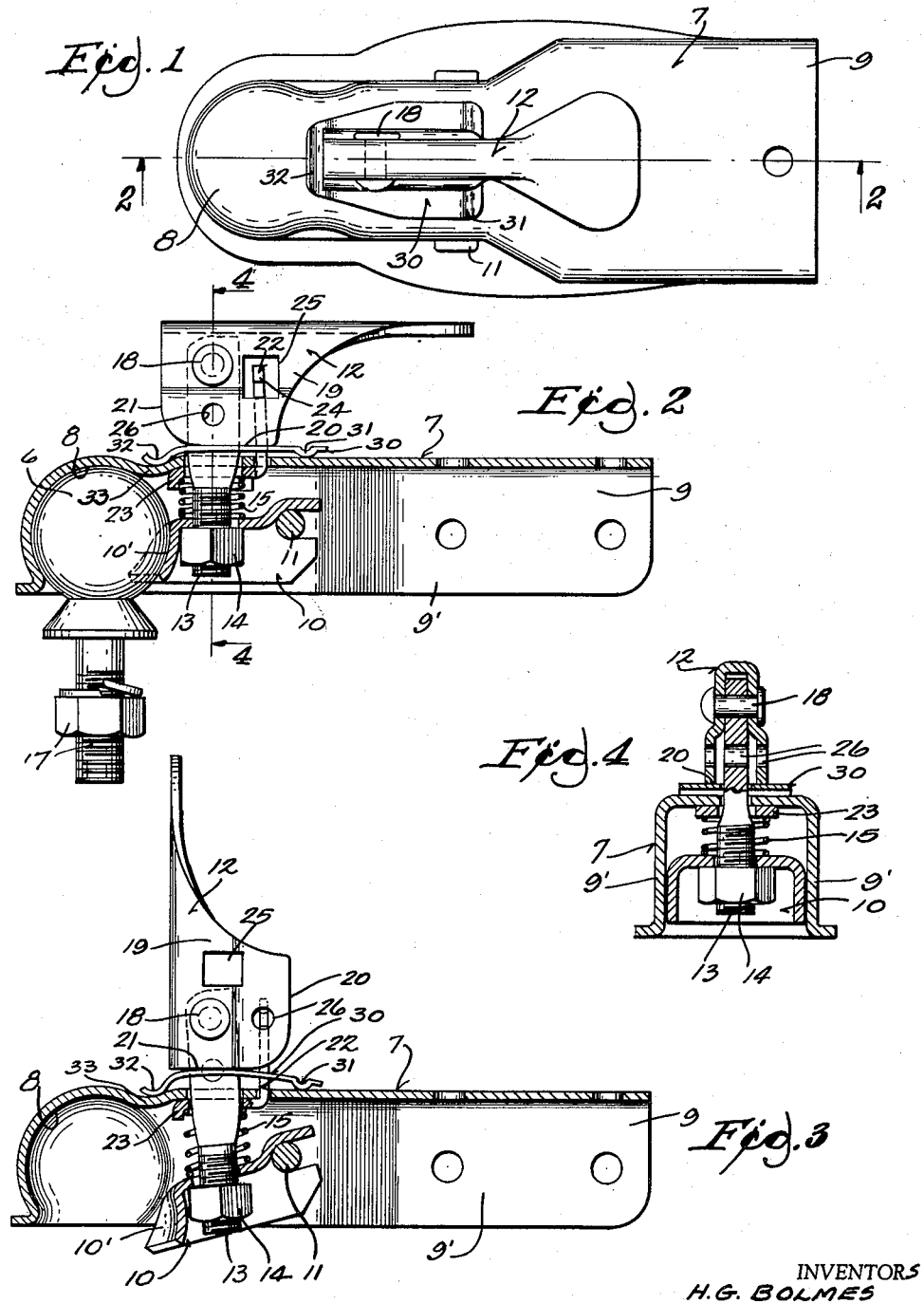
INVENTORS
H. G. BOLMES
A. L. FULTON
B. R. WEBER
BY
Lieber & Nilles
ATTORNEYS

United States Patent Office 3,153,545
Patented Oct. 20, 1964

3,153,545
TRAILER COUPLING
Henry G. Bolmes, West Allis, and Allen L. Fulton and Bernard R. Weber, Wauwatosa, Wis., assignors to The Fulton Company, West Allis, Wis., a corporation of Wisconsin
Filed May 7, 1963, Ser. No. 278,593
5 Claims. (Cl. 280—512)

The present invention relates generally to improvements in trailer couplings, and relates more particularly to the provision of an improved trailer coupling of the ball and socket type in which a cam lever cooperates with a retainer plate to maintain the ball within the socket.

A primary object of the invention is to provide a cam actuated ball and socket trailer coupling which is extremely simple and durable in construction and which is composed of exceptionally few parts capable of ready assemblage.

It has heretofore been proposed in a number of instances to provide ball and socket type trailer couplings which embody a retractable ball retainer pivotally carried by the socket member for swinging movement into and out of engagement with the ball member to maintain the ball within or to release the same from the socket. In such prior coupling devices, it is common practice to employ a cam lever of one type or another cooperable with the retainer plate through an actuating rod or link for swinging the retainer about its pivot toward and away from the ball, and it is also customary to incorporate releasable safety latch mechanism cooperable with the cam lever or with the actuating rod in these devices for preventing accidental separation of the assembled ball and socket members.

Some examples of ball and socket trailer couplings of this type may be found in United States Patents No. 2,726,099, dated December 6, 1955 (reissued September 24, 1957 as Patent No. Re. 24,362), No. 2,824,754, dated February 25, 1958, and No. 2,987,325, dated June 6, 1961; and while these prior patented devices and others have enjoyed satisfactory operation and commercial acceptance, they were all composed of an excessive number of parts requiring time-consuming assembly operations. For instance, in all of the prior known assemblages, a relatively heavy main coil spring is employed to normally urge the ball retainer plate into snug engagement with the ball member, the spring being located in a relatively inaccessible position surrounding the lower end of the actuating rod between depending side walls of the socket member with a lock nut or lock washer being required to prevent displacement of the spring from the rod. In addition, it is common practice to provide a bearing plate between the cam surface of the actuating lever and the adjacent top wall of the socket member to prevent excessive wear of the socket member while providing a smooth surface for movement of the cam. Thus, the selling price of the final assemblages is necessarily adversely affected by the additional assembly time plus the cost of parts, and additional maintenance is likewise required.

It is therefore an important object of this invention to provide an improved ball and socket type trailer coupling which obviates all of the aforesaid objections and disadvantages attendant prior devices of the same general type.

Another object of the invention is to provide an improved trailer hitch of the ball and socket type wherein the spring for normally urging the ball retainer toward and into engagement with the ball member together with the bearing plate for the cam surface of the actuating member are combined as a single element.

Still another object of our present invention is to provide an improved cam actuated ball and socket trailer hitch which is highly efficient in operation while eliminating any need whatsoever for a separate coil spring and attendant lock nuts or washers for urging the ball retainer into engagement with the ball member.

A further object of the present invention is to provide a highly simplified trailer coupling of the cam actuated ball and socket type wherein the bearing plate for the cam actuator is in the nature of a leaf spring which functions to urge the actuator and the ball retainer upwardly toward and into engagement with the ball member at all times to thereby eliminate the need for a separate spring for such purpose, the combination bearing plate and spring being positioned in a conveniently accessible location.

These and other additional objects and advantages of the present invention will become apparent from the following detailed description.

A clear conception of the several features constituting the invention, and of the construction and operation of a typical trailer hitch or coupling embodying the improvements, may be had by referring to the drawing constituting and forming a part of this specification wherein like reference characters designate the same or similar parts in the various views.

FIG. 1 is a top view of a typical fully assembled ball and socket trailer coupling embodying the invention;

FIG. 2 is a longitudinal vertical section through the coupling assemblage of FIG. 1, taken along the line 2—2, but with the ball member, retainer actuating rod and cam lever shown in elevation;

FIG. 3 is a section similar to FIG. 2 but with the cam lever swung to ball release position and with the ball member removed; and FIG. 4 is a transverse vertical section through the socket portion of the coupling, taken along the line 4—4 of FIG. 2.

While the invention has been shown and described herein as being advantageously applied to and embodied in a ball and socket trailer coupling of a certain type having a vertically swingable actuating cam lever and a horizontally swingable safety latch cooperable with the lever for holding the same in ball retaining position, it is not intended or desired to unnecessarily limit or restrict the use or application of the improvements by reason of such specific embodiment; and it is also contemplated that certain specific descriptive terminology as used herein will be given the broadest possible interpretation consistent with the disclosure.

Referring to the drawing, the improved trailer hitch shown therein as embodying the invention comprises, in general, a ball member 6, and a socket member 7 having a spherical zone 8 at one end within which the ball member 6 may be snugly confined, the socket member 7 also having a trailer tongue attaching zone 9 defined by integral depending side walls 9'. A ball retainer 10 is pivotally suspended from the socket member 7 as by means of a pivot pin 11 extending between and secured to the side walls 9', and the retainer 10 is cooperable with the ball member 6 to hold the latter against the spherical zone surface 8.

In the present instance, the retainer 10 is shown as being actuated by means of a cam lever 12 pivotally secured to the upper end of a vertical actuating rod 13 which penetrates both the upper wall of the socket member 7 and the retainer plate 10, the actuating rod 13 being threaded to receive a nut 14 functioning to prevent displacement of the retainer 10. Also, a relatively light coil spring 15 is interposed and compressed between the ball retainer 10 and the adjacent upper wall of the socket member 7, the spring 15 acting to constantly resiliently urge the retainer 10 to ball release position while also cooperating with the latch to actuate the same to its holding position as will hereafter more fully appear.

The ball member 6, socket member 7, retainer 10 and lever 12 may all be formed of durable sheet metal or the like with the aid of punches and dies, and the ball member 6 is also provided with a depending rigid bolt and nut assemblage 17 for effecting firm and rigid attachment thereof to a hauling or towing vehicle, not shown. The lever 12 is generally U-shaped in cross-section and is suitably secured to the upper extending end of the actuating rod 13 as by means of a pivot pin or bolt 18 extending through its depending side walls 19 and the end of the rod, the marginal edges of the lever side walls 19 being formed with cam surfaces 20, 21.

To positively hold the lever 12 in ball retaining position as shown in FIG. 2, a suitable latch 22 may be provided and in the present instance the latch is of the same type as shown and described in Patent No. 2,987,325. Briefly, this latch is formed of sheet metal or the like and has a base portion 23 penetrated by the rod 13 and acted upon by the spring 15 for constantly urging its upwardly extending arm and lateral projection 24 into locking position, the latch projection 24 being receivable by an aperture 25 in the side wall 19 of the lever 12 when the lever is in the position shown in FIG. 2 with the latch being manually tiltable to release the projection 24 from its holding position at the will of the operator. To provide additional positive locking means, the side walls 19 of the lever 12 and the intermediate portion of the actuating rod 13 may also be formed with alignable apertures 26 for receiving a padlock or the like.

In the device thus described, it is also necessary in order to prevent accidental displacement of the various parts to provide means for normally urging the ball retainer 10 into ball engaging and retaining position, and in the past, such means has ordinarily consisted of a relatively heavy coil spring embracing the rod 13 and interposed between the nut 14 and the retainer plate 10. It has also been customary in prior devices to provide a bearing plate between the upper wall of the socket member 7 and the cam lever 12 so as to provide a smooth bearing and wearing surface for the cam surfaces 20, 21.

In the present instance however, these two separate elements have been combined into a single element in the nature of a leaf spring 30 interposed between the cam surfaces of the lever 12 and the adjacent external surface of the upper wall of the socket member 7, the spring 30 being penetrated by the actuating rod 13. The spring 30 may either be bowed upwardly to constantly engage the cam surfaces 20, 21 or the opposite ends of the spring 30 may be formed with transverse end detents 31, 32 seated on the member 7, or both as shown, and the transverse detents 31, 32 not only add to the strength of the leaf spring but also serve to space the effective spanning portion of the spring from the top wall of the socket member 7 and act as bearings for the spring in its flexing movement. Furthermore, the socket member 7 may conveniently be formed with a transverse recess 33 between the ball receiving zone 8 and the trailer tongue attaching portion 9 within which the detent 32 may be received to prevent accidental displacement of the spring 30.

To assemble the socket member 7, it is only necessary to position the spring 30 as shown and to also position the retainer 10 on the pivot pin 11. The actuating rod 13 which has previously been secured to the actuating lever 12 may then be projected through the aligned openings in the spring 30, upper wall of the socket member 7 and retainer 10, the coil spring 15 along with the latch 22 being interposed between the ball retainer 10 and top wall of the socket member 7 at the time of such assembly. The parts may then be retained in assembled condition by swinging the free end of the retainer 10 toward the adjacent upper wall of the socket member 7 to compress the spring 15 and permit application of the nut 14 to the threaded lower end of the rod 13.

When the nut 14 has been applied and tightened to the desired extent, the pressure on the ball retainer 10 and spring 15 may be released and the retainer will thereupon automatically be forced against the nut which coacts with the depending ball engaging portion 10' of the retainer 10 to thereby positively lock the nut in position and against displacement on the rod 13.

With the improved coupling thus assembled the ball member 6 may be firmly attached to a hauling vehicle by means of the bolt and nut assemblage 17 and the socket member 7 may be rigidly attached to a trailer tongue as by means of bolts in the usual manner. The trailer may then be coupled to the hauling vehicle by swinging the lever 12 upwardly and placing downward pressure thereon so as to permit insertion of the ball 6 within the spherical socket 8 past the ball retainer. After the ball 6 is positioned within the socket 8, the lever 12 may be swung about its cam surface to the position shown in FIG. 2 whereupon the spring 15 is compressed along the leaf spring 30 and the ball retainer 10 is maintained in snug engagement with the ball member 6. In this position, the latch 22 becomes effective to hold the lever 12 and retainer 10 in ball retaining position, and the assemblage is ready for hauling use.

When it is desired to release the socket member 7 from the ball 6, it is only necessary to depress the lateral projection 24 of the latch 22 inwardly and to then swing the lever 12 vertically to the position shown in FIG. 3, whereupon the socket member 7 may be readily removed. During this operation, the spring 15 serves to urge the retainer 10 counterclockwise about its pivot 11 to open position while the spring 30 serves to urge the lever and actuating rod upwardly to prevent complete disassembly of the parts, and at all times, the nut 14 is effectively locked in position on the rod 13 by its engagement with the depending wall portion of the ball retainer 10.

From the foregoing detailed description, it is believed apparent that the present invention provides an extremely simple trailer coupling assemblage which comprises relatively few parts capable of ready assemblage. The leaf spring 30 effectively acts as a bearing plate for the cam surfaces 20, 21 of the lever 12 while also replacing the usual coil spring which is normally inconveniently located below the ball retainer 10 and between the depending side walls 9' of the socket member 7. Thus, not only does the device eliminate excessive parts, but the assembly thereof is greatly facilitated.

Various modes of carrying out the invention are contemplated as being within the scope of the following claims particularly pointing out and distinctly claiming the subject matter which is regarded as the invention.

We claim:

1. A trailer coupling comprising, interconnectable ball and socket members, a retainer suspended from said socket member and movable to selectively connect and release said ball member to and from said socket member, a rod extending through said socket member and having one end thereof connected with said retainer, a helical spring surrounding said rod and interposed between said retainer and said socket member for constantly resiliently urging said rod and said retainer toward ball release position, an actuator connected with said rod remote from said retainer, said actuator having a cam surface movable relative to said socket member to reciprocate said rod and move said retainer into ball connecting position, and a leaf spring interposed between said actuator and said socket member and co-acting directly with said actuator to provide a bearing seat while also constantly urging said rod and said retainer toward ball connecting position in opposition to said helical spring.

2. A trailer coupling comprising, interconnectable ball and socket members, said socket member having an upper wall and depending side walls, a retainer suspended from said socket member between the side walls thereof and movable to selectively connect and release said ball member to and from said socket member, a rod extending through the upper wall of said socket member and having one end thereof connected with said retainer, a helical spring surrounding said rod and interposed between the upper wall of said retainer and said socket member for constantly resiliently urging said rod and said retainer toward ball release position, an actuating lever connected with said rod remote from said retainer and having a cam surface movable relative to the upper wall of said socket member to reciprocate said rod and move said retainer into ball connecting position, and a resilient curved plate interposed between said actuating lever and the upper wall of said socket member and having its medial portion co-acting with the cam surface of said actuating lever for constantly urging said rod and said retainer toward ball connecting position in opposition to said helical spring while also providing a bearing for said cam surface.

3. A trailer coupling according to claim 2, wherein the rod also extends through the medial portion of the resilient plate and is connected with the actuating lever by a pivot permitting swinging movement of the actuating lever to thereby move the cam surface on said plate.

4. A trailer coupling according to claim 2 wherein the resilient plate is curved and has its end portions engaged with the upper wall of the socket member and its intermediate portion bowed outwardly away from said wall into constant engagement with the cam surface of the actuating lever.

5. A trailer coupling according to claim 4, wherein one of the ends of the curved plate is seated within a transverse recess formed in the upper wall of the socket member to prevent displacement of said plate while the other end thereof is slidably engaged with the upper wall of the socket member.

References Cited by the Examiner
UNITED STATES PATENTS

| | | | |
|---|---|---|---|
| 1,841,890 | 1/32 | Hannon | 292—204 |
| 2,987,325 | 6/61 | Fulton | 280—512 |
| 3,065,985 | 11/62 | Du Four | 292—103 |

A. HARRY LEVY, *Primary Examiner.*

PHILIP ARNOLD, *Examiner.*